Sept. 9, 1969     O. BRYCHTA ET AL     3,465,752
APPARATUS FOR THE CONTROL OF PRESSURE RESPIRATOR
Filed Sept. 23, 1966                         2 Sheets-Sheet 1

Ondřej Brychta, Josef Pučko,
Ondřej Kilík, Miroslav Čapla
INVENTORS
By Richard ... Ag't United States Patent Office 3,465,752
Patented Sept. 9, 1969

3,465,752
APPARATUS FOR THE CONTROL OF PRESSURE RESPIRATOR
Ondrej Brychta, Josef Tlucko, Ondrej Kolik, and Miroslav Capla, Trencin, Czechoslovakia, assignors to Chirana, Zavody zdravotnickej techniky, odborovy podnik, Stara Tura, Czechoslovakia
Filed Sept. 23, 1966, Ser. No. 581,475
Claims priority, application Czechoslovakia Sept. 27, 1965, 5,856/65
Int. Cl. A62b 7/00
U.S. Cl. 128—145.8       5 Claims

ABSTRACT OF THE DISCLOSURE

A pressure respirator in which a pneumatic amplifier chamber is divided into two compartments by a flexible diaphragm movable toward and away from a position in which the diaphragm closes an orifice in one of the compartments. Oxygen or air under pressure may be supplied to the orifice through a series arrangement of a first ejector, a mixing chamber, a second ejector, and the nozzle which terminates in the orifice. The mixing chamber and the two compartments communicate with the atmosphere through venting conduits equipped with throttles, the mask of the respirator communicates with the nozzle, and the other compartment is connected with the mixing chamber through a throttled conduit. When the throttles are properly set, the supply of breathing mixture is automatically synchronized with the spontaneous breathing of the patient wearing the mask.

---

This invention relates to respirators and particularly to a respirator equipped for automatic synchronization of the artificial respiration cycle with the spontaneous breathing of a patient.

Known respirator controls capable of such operation are complex and correspondingly apt to fail, also too heavy to permit the control mechanism to be attached directly to the mask. The hoses which connect the control mechanism with the mask present significant dead spaces whose gas pressure must be controlled.

The primary object of the invention is the provision of a respirator of the described type which is light in weight and of small dimensions.

The respirator of the invention employs a pneumatic amplifier in which the cavity of an amplifier chamber is divided by a diaphragm into a first compartment and a second compartment. An annular seat extends about an orifice of a nozzle in the second compartment, and the diaphragm is movable toward and away from a position of engagement with the seat in which the diaphragm closes the orifice.

A first conduit system which can supply an oxygen bearing gas under pressure to the orifice includes a mixing chamber communicating with the atmosphere, a first ejector for connecting a source of gas under pressure to the mixing chamber and for thereby drawing atmospheric air into the chamber, and a second ejector interposed between the mixing chamber and the nozzle for supplying the mixture produced in the chamber to the nozzle. The mask of the respirator communicates with the nozzle for aspiration of gas from the mask by the mixture supplied by the second ejector.

A second conduit system communicates with the first-mentioned conduit system and the first compartment of the amplifier chamber and includes a first throttling device for impeding flow of gas between the first conduit system and the first compartment which is vented to the atmosphere by a conduit in which a second flow impeding throttling device is arranged. Another venting conduit connects the second compartment to the atmosphere and the second throttling device is capable of increasing the flow resistance of the associated venting conduit beyond that of the other venting conduit.

Figure 1:
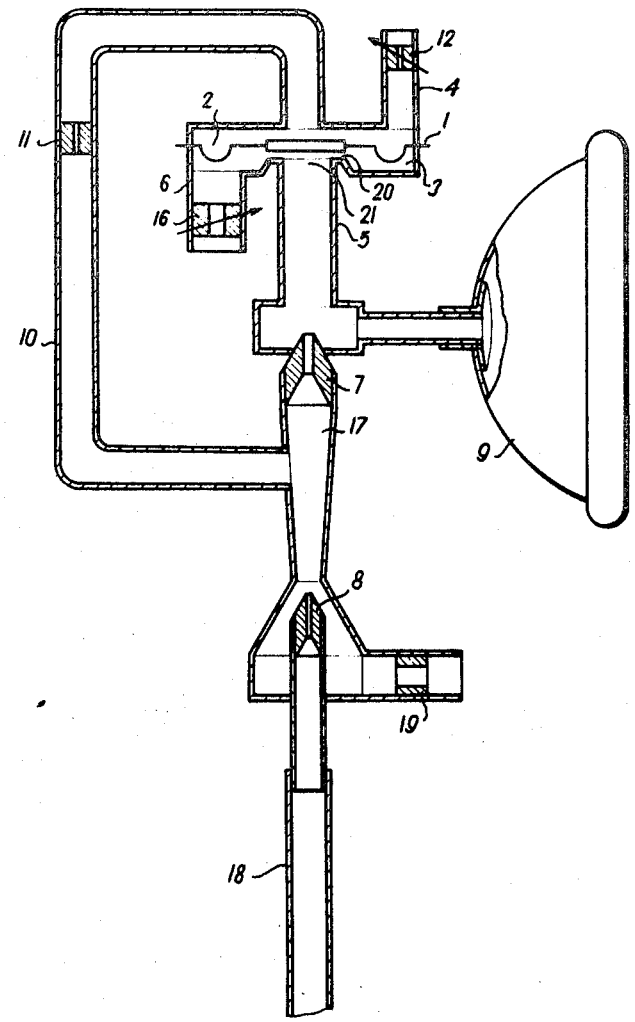
Figure 2:
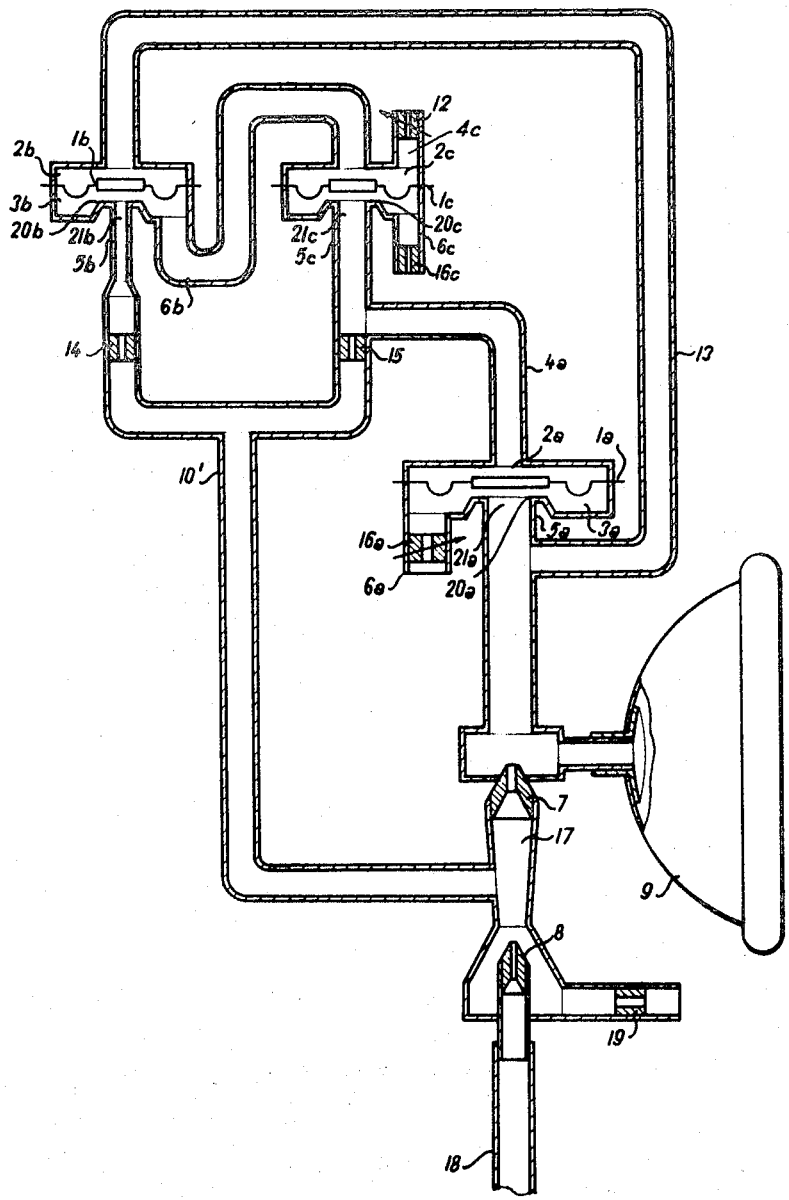

Other features and the attendant advantages of this invention will readily become apparent from the following description of preferred embodiments when considered in connection with the appended drawing in which:

FIG. 1 shows a respirator of the invention in elevational section; and
FIG. 2 illustrates a modification of the apparatus of FIG. 1 in a corresponding view.

Referring initially to FIG. 1, there is seen a pneumatic amplifier whose chamber 21 is divided by a flexible diaphragm into a first compartment 2 and a second compartment 3. A nozzle 5 terminates in an orifice in the wall of the compartment 3 which forms an annular seat 20 about the orifice. The diaphragm may be deflected from the illustrated position into sealing engagement with the seat 20. Venting conduits 4, 6 respectively connect the compartments 2, 3 to the atmosphere, and are equipped with adjustable throttles 12, 16 the throttle 12 being normally smaller in flow section than the throttle 16 to increase the flow resistance of the venting conduit 4 beyond that of the conduit 6.

A supply conduit 18 normally connected to a non-illustrated source of air or oxygen at elevated pressure is attached to an ejector 8 which discharges the compressed gas into a mixing chamber 17 vented to the atmosphere through a throttle 19. Another ejector 7 connects the chamber 17 to the nozzle 5. A respirator mask 9 communicates with the nozzle 5 near the ejector 7. A conduit 10 equipped with a throttle 11 connects the mixing chamber with the first compartment 2 of the amplifier chamber 21.

The throttles referred to above may be constrictions of the associated conduits. Their flow resistance may be adjusted by varying either the cross section or the length of the constricted conduit section, as is well known in itself.

When gas under pressure is discharged from the ejector 8, air is drawn into the mixing chamber 17 from the atmosphere, and the resulting mixture enters the nozzle 5 from the ejector 7 and is discharged through the venting conduit 6, thereby reducing the gas pressure in the mask 9 and in the respiratory tract of a patient wearing the mask. Artificial exhalation is caused. The partial vacuum produced in this manner is limited by the fact that the mixture from the chamber 17 also flows into the first compartment 2 through the partly restricted conduit 10. The resulting pressure increase in the compartment 2 eventually deflects the diaphragm 1 against the seat 20 and the nozzle 5 is closed.

The gas mixture discharged from the injector 7 now flows into the respiratory tract of the patient in an artificial inhalation step until the pressure in the nozzle 5 can balance the gas pressure applied to a greater surface area of the diaphragm 1 in the compartment 2. At the moment, the diaphragm 1 is quickly lifted from the nozzle orifice which is thereby connected to the atmosphere through the venting conduit 6, whereby a new exhalation phase of the artificial breathing cycle is initiated, and the sequence of events described above is repeated.

The duration of each phase of the cycle depends on the aspiration effects of the ejectors 7, 8 and on the flow resistance of the throttles 11, 12, 16. The nozzles 12, 16 are set so as to permit the pressure in the compartment 3 to drop below the pressure in the compartment 2 for terminating the exhalation phase and starting the inhalation period.

If spontaneous breathing of the patient is induced by the artificial breathing, the apparatus automatically synchronizes its operation with the breathing of the patient. When the patient actively inhales during the inhalation phase of the respirator, the duration of this phase is extended by the increased capacity of the respiratory tract which retards the pressure rise in the closed nozzle 5. When breathing of the patient starts with inhalation while the respirator is in the exhalation phase, the resulting sudden pressure drop in the nozzle 5 causes the diaphragm 1 to engage the seat 20, thereby switching the respirator to inhalation.

FIG. 2 shows a modified respirator of the invention equipped with three pneumatic amplifiers 21a, 21b, 21c closely similar to the amplifier 21 described with reference to FIG. 1. The chamber of each amplifier 21a, 21b, 21c is divided into compartments 2a, 2b, 2c and 3a, 3b, 3c by a diaphragm 1a, 1b, 1c which may engage a seat 20a, 20b, 20c at the orifice of a nozzle 5a, 5b, 5c.

The nozzle 5a receives a mixture of a compressed gas and of atmospheric air from an ejector 7, the mixture being formed in a mixing chamber 17 open to the atmosphere through a throttle 19 by means of an ejector 8 connected to a supply conduit 18 as described above, and communicates with the respirator mask 9. The compartment 3a is vented to the atmosphere through a conduit 6a equipped with an adjustable throttle 16a.

A conduit 13 connects the nozzle 5a with the compartment 2b of the amplifier 21b which is otherwise sealed, and a conduit 6b connects the compartment 3b of the second amplifier with the compartment 2c of the third amplifier 21c, the compartment 2c being vented to the atmosphere by a conduit 4c equipped with an adjustable throttle 12. The compartment 3c of the third amplifier is vented by a conduit 6c equipped with a throttle 16, and the nozzle 5c is connected with the compartment 2a of the amplifier 21a through a conduit 4a, the compartment 2a being otherwise sealed.

A branched conduit 10' communicates with the mixing chamber 17. One of its branches is equipped with a throttle 14 and leads into the nozzle 5b of the amplifier 21b, and the other branch having a throttle 15 leads into the nozzle 5c of the amplifier 21c.

The apparatus shown in FIG. 2 operates in a manner analogous to the afore-described operation of the device of FIG. 1.

When a compressed gas is discharged from the ejector 8, the pressure initially decreases in the mask 9 until the diaphragm 1a closes the nozzle 5a. Thereafter, the pressure is increased in the nozzle 5a, but also in the conduit 13 and the compartment 2b, whereby the diaphragm 1b is deflected toward the seat 20b to seal the nozzle 5b. This causes an interruption in the flow of gas under positive pressure from the mixing chamber 17 through the conduits 10' and 6b into the compartment 2b, and the nozzle 5c, initially closed by the diaphragm 1c is opened by the continuing pressure build-up in the conduit 4a so that the conduit together with the compartment 2a is vented through the throttle 16c, whereby the diaphragm 1a is further held in engagement with the seat 20a.

When the pressure in the mask 9 reaches its upper limiting value, the diaphragm 1a is released from the seat 20a, and the gas accumulated in the nozzle 5a can expand through the venting conduit 6a, starting the exhalation phase of the artificial breathing cycle. As the pressure in the conduit 13 drops thereafter, the diaphragm 1b is lifted from the seat 20b, and gas under pressure from the conduit 10' can reach the compartment 2c, thereby causing the diaphragm 1c to engage the seat 20c, and to seal the nozzle 5c. All gas flowing through the throttle 15 is thereafter led to the compartment 2a and ultimately forces the diaphragm 1a into engagement with the seat 20a, thereby terminating the exhalation phase.

The events outlined above are repeated cyclically until the patient starts breathing spontaneously. The apparatus thereafter operates in synchronization with the active breathing of the patient as described with reference to FIG. 1.

We claim:
1. A pressure respirator comprising, in combination:
 (a) a respirator mask (9);
 (b) a pneumatic amplifier chamber (21) enclosing a cavity;
 (c) a diaphragm (1) dividing said cavity into a first compartment (2) and a second compartment (3);
 (d) a nozzle (5) terminating in an orifice in said second compartment (3);
 (e) means defining an annular seat (20) about said orifice,
  (1) said diaphragm (1) being movable in said chamber toward and away from a position of engagement with said seat (20) in which said diaphragm closes said orifice;
 (f) first conduit means (18, 8, 17, 7) for supplying an oxygen bearing gas under pressure to said orifice, said conduit means including
  (1) a mixing chamber (17) communicating with the atmosphere,
  (2) first ejector means (8) for connecting a source of gas under pressure to said mixing chamber and for thereby drawing atmospheric air into said mixing chamber, and
  (3) second ejector means (7) interposed between said mixing chamber (17) and said nozzle (5) for supplying the mixture produced in said mixing chamber to said nozzle, said mask (9) communicating with said nozzle for aspiration of gas from said mask by the mixture supplied by said second ejector means;
 (g) second conduit means (10) communicating with said first conduit means and said first compartment (2) and including first throttling means (11) for impeding flow of gas between said first conduit means and said first compartment;
 (h) a first venting conduit (4) for connecting said first compartment (2) to the atmosphere;
 (i) second throttling means (12) in said venting conduit for impeding flow of gas in the same; and
 (j) a second venting conduit (6) connecting said second compartment (3) to the atmosphere,
  (1) said second throttling means (12) being adapted to increase the flow resistance of said first venting conduit (4) beyond the flow resistance of said second venting conduit (6).

2. A respirator as set forth in claim 1, wherein said second conduit means (10) communicate directly with said mixing chamber (17).

3. A respirator as set forth in claim 1, wherein said second throttling means (12) is adjustable for varying the flow resistance of said first venting conduit.

4. A respirator as set forth in claim 1, further comprising adjustable third throttling means (16) in said second venting conduit (6) for varying the flow resistance of the same.

5. A respirator as set forth in claim 1, further comprising a second pneumatic amplifier chamber (21b) and a third pneumatic amplifier chamber (21c) defining respective cavities; a diaphragm (1b, 1c) in each of said cavities and dividing the same into a first compartment (2b, 2c) and a second compartment (3b, 3c); two nozzles (5b, 5c) respectively terminating in orifices in the second compartments of said second and third amplifier chambers; means defining annular seats (20b, 20c) about the last mentioned orifices, said diaphragms (1b, 1c) in the cavities of said second and third amplifier chambers being movable toward and away from respective positions of sealing engagement with the associated seats; said second conduit means (10') further comprising a branch conduit connecting said mixing chamber (17) with the second compartment (3b) in said second amplifier chamber and throttling means (14) in said branch circuit; said first venting conduit (4a) connecting the first compartment (2a) of said first-mentioned pneumatic amplifier chamber to the nozzle (5c) terminating in the second compartment (3c) of said third pneumatic amplifier chamber (21c); a venting conduit (6c) connecting the last mentioned compartment to the atmosphere; a throttle (16c) in said last-mentioned venting conduit; another conduit (13) connecting the first-mentioned nozzle (5) to the first compartment (2b) of said second pneumatic amplifier chamber (21b); yet another conduit (6b) connecting the second compartment (3b) of said second pneumatic amplifier chamber (21b) with the first compartment (2c) of said third pneumatic amplifer chamber (21c), and restricted venting means (4c) for venting the last-mentioned compartment.

References Cited

UNITED STATES PATENTS

| Re. 23,496 | 5/1952 | Seeler | 128—145.8 |
| 2,376,348 | 5/1945 | Fox | 128—145.8 |
| 2,897,833 | 8/1959 | Seeler | 128—145.8 |
| 3,071,131 | 1/1963 | Johannisson et al. | 128—145.5 |
| 3,073,298 | 1/1963 | Stanton | 128—145.8 |
| 3,319,627 | 5/1967 | Windsor | 128—145.8 |

CHARLES F. ROSENBAUM, Primary Examiner